United States Patent
Matsunaga

(10) Patent No.: US 6,340,319 B1
(45) Date of Patent: Jan. 22, 2002

(54) BATTERY TERMINAL

(75) Inventor: Hideki Matsunaga, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/759,405

(22) Filed: Jan. 12, 2001

(30) Foreign Application Priority Data

Dec. 1, 2000 (JP) ............................................. 12-003511

(51) Int. Cl.$^7$ ................................................. H01R 4/50
(52) U.S. Cl. ...................................................... 439/761
(58) Field of Search ................................. 439/761, 762, 439/763, 764, 765

(56) References Cited

U.S. PATENT DOCUMENTS

| | | | |
|---|---|---|---|
| 4,354,726 A | | 10/1982 | Kato et al. |
| 5,221,219 A | * | 6/1993 | Thomson .................... 439/762 |
| 5,492,780 A | | 2/1996 | Okada |
| 5,498,178 A | * | 3/1996 | Tahata ......................... 439/762 |
| 5,558,545 A | * | 9/1996 | Staab et al. .................. 439/762 |
| 5,616,433 A | * | 4/1997 | Kau ............................. 439/762 |
| 5,707,257 A | * | 1/1998 | Kotajima et al. ............ 439/762 |
| 5,711,688 A | * | 1/1998 | Matsunaga et al. ......... 439/762 |
| 5,851,129 A | * | 12/1998 | Matsunaga et al. ......... 439/764 |
| 5,893,781 A | * | 4/1999 | Matsunaga et al. ......... 439/762 |
| 5,941,738 A | * | 8/1999 | Matsunaga et al. ......... 439/762 |

FOREIGN PATENT DOCUMENTS

| | | |
|---|---|---|
| EP | 0 653 806 A1 | 10/1993 |
| EP | 0 742 606 A1 | 11/1996 |

* cited by examiner

Primary Examiner—Tulsidas Patel
Assistant Examiner—Phuong Dinh
(74) Attorney, Agent, or Firm—Anthony J. Casella; Gerald E. Hespos

(57) ABSTRACT

A connector includes extending portions (12) formed with ribs (23) and receiving surfaces (24) that function as primary stoppers (22) to restrict movement of the extending portions (12) toward each other by contact each other when a spacing between the extending portions (12) is narrowed to a specified degree. A second stopper (25) restricts any further approach of the extending portions (12) by being brought into a contact state when the spacing between the extending portions (12) is further narrowed from the state where the primary stoppers (22) are in their contact states while being accompanied by deformation of the extending portions (12). Since two excessive fastening preventing functions are provided by providing the secondary stopper (25) in addition to the primary stoppers (22) in this embodiment, reliability of the excessive fastening preventing function is higher as compared to a case where only one stopper is provided.

10 Claims, 6 Drawing Sheets

BATTERY TERMINAL

BACKGROUND OF THE INVENTION

1. Field of the Invention

The present invention relates to a battery terminal.

2. Description of the Related Art

A conventional battery terminal, as disclosed in Japanese Utility Model Publication No. 6-88050, includes an arcuate fastening portion that can be fitted on a battery post. Extending portions extend radially outward from the opposite ends of the fastening portion. A bolt extends between the extending portions and a nut can be threaded onto the bolt. Thus, a tightening of the nut on the bolt brings the extending portions closer to each other to reduce a diameter of the fastening portion.

A proper fastening torque applied to the nut ensures that the extending portions have a proper spacing, and that the radius of curvature of the fastening portion is set to a proper value. Consequently, the torque normally is controlled to avoid excessive fastening of the battery post. However, an excessively large fastening torque can be applied to the nut of the above described battery terminal. Forces created by this high torque can bring the extending portions of the battery terminal too close to each other, thereby excessively reducing a radius of curvature of the fastening portion. Additionally, the battery post may undergo an abnormal deformation.

Although the torque typically is controlled, it is necessary to account for a situation where the torque exceeds the normal range. For example, a stopper may project from one extending portion sufficiently to contact the other extending portion while the fastening torque still lies in the normal range. Thus, even if the fastening torque exceeds the normal range, the stopper limits the approach of the extending portions toward each other.

However, the fastening torque can be sufficiently large to deform the stopper. As a result, the stopper cannot prevent the adverse effects of all excessive fastening forces.

In view of the above situation, an object of the present invention is to improve reliability of an excessive fastening preventing function.

SUMMARY OF THE INVENTION

The subject invention is directed to a connection device for a battery terminal or battery post. The connection device comprises at least one arcuate fastening portion that can be fitted on a battery post and at least two extending portions that project from the arcuate fastening portion. The extending portions preferably project radially outward from opposed ends of the arcuate fastening portion. A fastening means is provided for reducing the diameter of the fastening portion by bringing the extending portions closer to each other. In a preferred embodiment, the fastening means comprises a bolt and a nut.

The extending portions of the connection device comprise primary and secondary stoppers for limiting movement of the extending portions toward each other. The primary stopper may be brought into a contact state when the space between the extending portions is narrowed to a specified degree. The secondary stopper may be brought into a contact state when the space between the extending portions is narrowed further from the state where the primary stopper reaches its contact state. Such a further narrowing may be due to a deformation of the primary stopper and/or the extending portions.

The extending portions are brought closer to each other and to a proper spacing when a proper pre-established torque is applied to the nut and the bolt of the fastening means. Thus, the battery post is fastened with a proper strength.

The extending portion may be brought closer than the proper spacing if the applied fastening torque exceeds the proper value. However, the primary stopper is brought into the contact state to restrict any further approach of the extending portions with respect to each other while the space between the extending portions is still in a permissible range. This prevents the battery terminal from being excessively fastened to the battery post.

The fastening torque conceivably could exceed a value bearable by the primary stopper. In this situation, the extending portions are brought closer to each other due to a deformation of the primary stopper or the extending portions. However, the secondary stopper is brought into its contact state to restrict any further approach of the extending portions toward each other. This contact state of the secondary stopper occurs while the spacing between the extending portions still lies in the permissible range where fastening to the battery post is assumed to be normal. Thus, a fastening force on the batter post will not exceed the permissible range.

The primary and secondary stoppers enable two excessive fastening preventing functions to be provided. Therefore, reliability of the excessive fastening preventing function is higher as compared to a case where only one stopper is provided.

An elastic restoring force preferably acts on the deformed primary stopper and/or the extending portions to separate the extending portions away from each other while the secondary stopper is restricting any further approach of the extending portions toward each other. Thus, the approach-restricting function is better as compared to a case where only the secondary stopper restricts the approach of the extending portions.

The secondary stopper preferably is configured such that the fastening torque that is required to deform the secondary stopper exceeds the fastening torque that is required to fracture the bolt. Thus, the fastening torque will fracture the bolt before the fastening torque deforms the secondary stopper. Accordingly, deformation of the secondary stopper can be prevented.

The primary stopper may comprise a rib formed by bending an outer end of one extending portion at an angle different from 0° or 180°, preferably substantially at right angles. The primary stopper may further comprise a receiving surface formed on the other extending portion and disposed for contact with the rib.

The secondary stopper preferably comprises substantially tubular projections formed on the extending portions to project substantially toward each other. The tubular projections preferably are formed by applying burring to edges of bolt insertion holes of the respective extending portions. Tubular projections formed by burring have excellent strength, and therefore are suitable as the secondary stopper, which is required to be stronger than the primary stopper.

Most preferably, the extending portions each are formed with a primary stopper and a secondary stopper.

These and other objects, features and advantages of the present invention will become apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
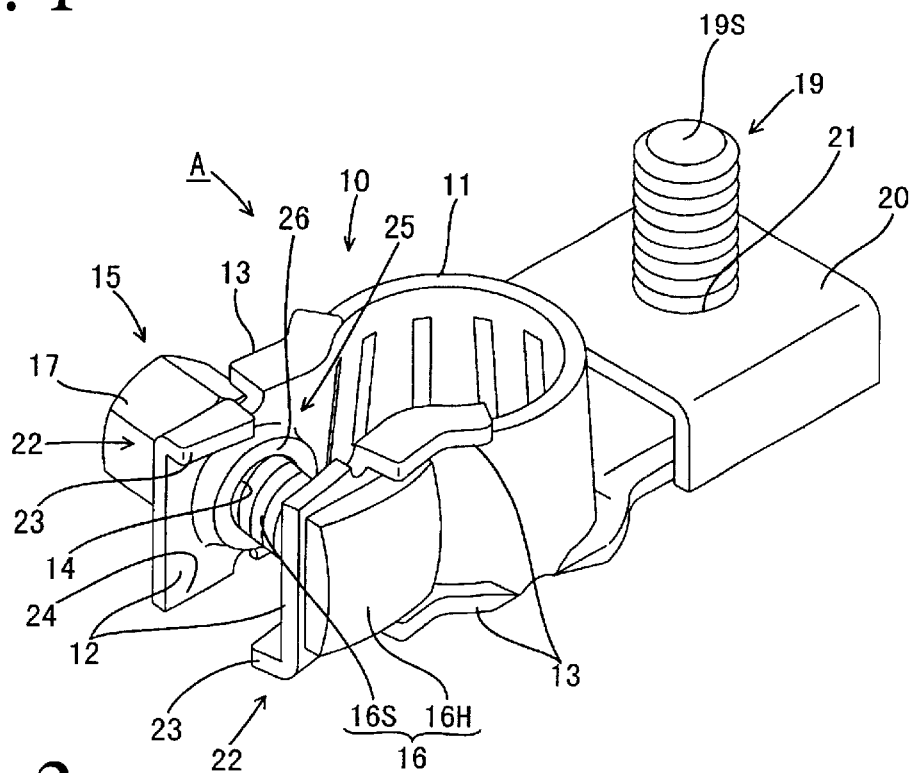
FIG. 1 is a perspective view of a first embodiment of the invention.
Figure 2:
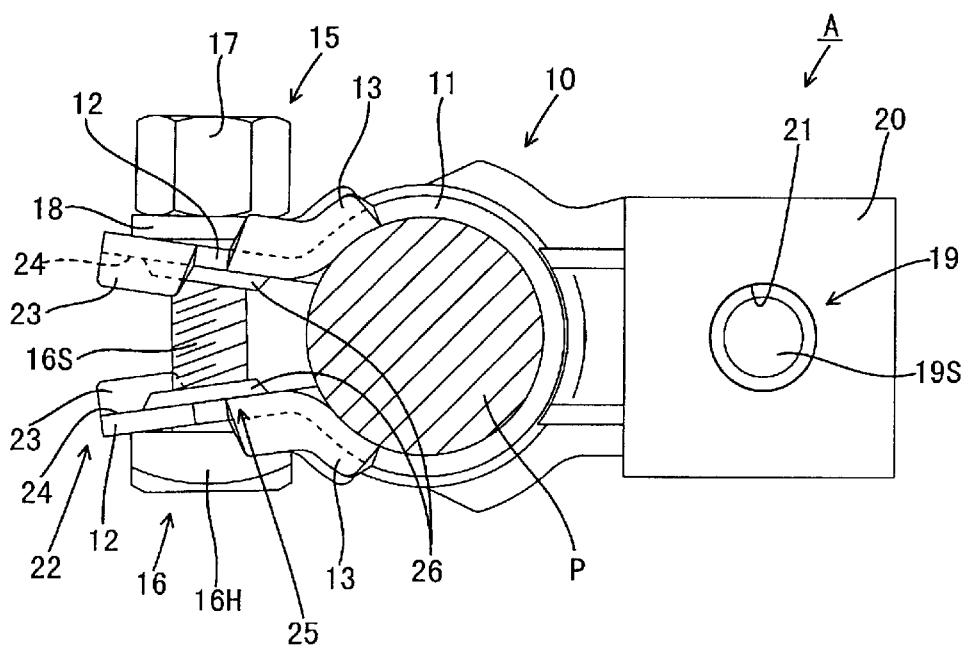
FIG. 2 is a plan view of the first embodiment.

A battery terminal in accordance with a first embodiment of the subject invention is identified generally by the letter A in FIGS. 1–7. The battery terminal A is comprised of a terminal main body 10 and a fastening means 15. The terminal main body 10 is integrally or unitarily provided with an arcuate fastening portion 11 that can be disposed to surround at least a portion of the battery post P. Two extending portions 12 project substantially radially outward from opposite ends of the arcuate fastening portion 11. The terminal main body 10 is formed with primary stoppers 22 and a secondary stopper 25. Additionally, a stud bolt 19 is mounted on the main body 10 for connecting an unillustrated wire with the battery terminal A. The fastening means 15 comprises a bolt 16 and a nut 17. The bolt 16 extends between the extending portions 12 and the nut 17 is threaded on the bolt 16. Thus, the extending portions 12 can be brought closer to each other by tightening the nut 17 on the bolt 16 sufficiently to deform the fastening portion 11 and to reduce the diameter of the fastening portion 11.

In the following description, a direction of a center axis of the fastening portion 11 is referred to as vertical direction, and a direction in which the extending portions 12 project from the fastening portion 11 is referred to as forward direction.

The fastening portion 11 is elastically deformable in substantially radial directions to increase or decrease its inner diameter. However, in an unbiased condition, the fastening portion defines an inner diameter that is larger than the outer diameter of the battery post P. Reinforcing portions 13 are formed at the upper and lower ends of the fastening portion 11 and are substantially continuous with the upper and lower edges of the extending portions 12. The reinforcing portions 13 bulge out substantially at right angles, and ensure that each extending portion 12 moves integrally with the adjacent end of the arcuate fastening portion 11.

The extending portions 12 are substantially rectangular flat plates, and are aligned obliquely to each other such that the front ends of the extending portions 12 are wider apart in the free or unbiased state of the fastening portion 11. When the extending portions 12 are brought closer to each other, the inner diameter of the arcuate fastening portion 11 is reduced gradually so that the fastening portion 11 grips the outer surface of the battery post P. The two extending portions 12 change their orientations as they are brought closer to each other, and thus the opposed surfaces of the extending portions 12 gradually become more parallel. Bolt insertion holes 14 are formed in substantially middle positions of the respective extending portions 12 and are aligned with one another.

The bolt 16 of the fastening means 15 has an externally threaded portion 16S and a substantially rectangular or polygonal head 16H that is formed integrally or unitarily at one end of the externally threaded portion 16S. The head 16H is slightly smaller than a space between the upper and lower reinforcing portions 13. Thus, the externally threaded portion 16S of the bolt 16 can be inserted through the bolt insertion holes 14, and a portion of the head 16H can be held between the upper and lower reinforcing portions 13 with little clearance. Consequently, rotation of the bolt 16 about its longitudinal axis is restricted by the engagement of the head 16H and the reinforcing portions 13. A washer 18 may be placed over the leading end of the threaded portion 16S of the bolt 16, and the nut 17 then is screwed on the leading end of the externally threaded portion 16S of the bolt 16 adjacent to the washer 18. As a result, the extending portions 12 are between the nut 17 and the head 16H of the bolt 16. When the nut 17 is screwed further onto the bolt 16, the two extending portions 12 are displaced toward each other, and thereby reduce the diameter of the fastening portion 11.

A substantially box-shaped holder 20 extends substantially continuously from the rear bottom end of the fastening portion 11. The holder 20 includes an upper surface with an exposure hole 21 and side walls that extend down from the upper surface. The stud bolt 19 has a polygonal head (not shown) that is non-rotationally retained between the side walls of the holder 20 and below the upper surface. The stud bolt 19 also includes an externally threaded portion 19S that projects upward through the exposure hole 21. A mount fitting (not shown) is secured to an end of the wire (not shown) and can be fitted on the stud bolt 19 and fixed thereto by a nut (not shown).

The extending portions 12 are formed with upper and lower primary stoppers 22. Each primary stopper 22 includes a rib 23 formed by bending an end of one extending portion 12 to extend substantially at right angles toward the mating extending portion 12. Each primary stopper 22 further includes a receiving surface 24 at an end of the inner surface of the mating extending portion 12 and opposed to one of the ribs 23. The reinforcing portion 13 and the receiving surface 24 are spaced slightly from one another. Thus, the receiving surface 24 is substantially flat in preferably its entire area. The rib 23 and the receiving surface 24 of each primary stopper 22 are engageable to restrict movement of the extending portions 12 toward each other to a spacing that is closer than a specified degree.

The secondary stopper 25 includes a pair of substantially tubular projections 26 formed on the extending portions 12. The projections 26 are formed e.g. by applying burring to the edges of the bolt insertion holes 14, and project toward each other from the inner surfaces of the corresponding extending portions 12. Alternatively, the projections 26 may be formed by bending tongues to project inward from the edges of the bolt insertion hole 14, so as to form circumferentially spaced preferably arcuate projections. The projections 26 also may be formed by affixing a separate tubular portion by soldering or the like. The two projections 26 preferably have substantially the same radial dimension. The projections 26 are spaced from one another by a distance that is greater than the distance between the ribs 23 and the receiving surfaces 24 of the primary stoppers 22. Thus, contact between the ends of the projections 26 of the secondary stopper 25 will restrict movement of the extending portions 12 toward each other to a specified degree.

Before the battery terminal A of this embodiment is mounted on the battery post P, a fastening torque of the bolt 16 and the nut 17 is set at a proper value. The fastening portion 11 then is loosely fitted on the battery post P, and the nut 17 is screwed onto the bolt 16 with the specified fastening torque. As a result, the extending portions 12 are brought closer to each other to have a proper spacing and the battery post P is fastened with a proper strength. At this time, the ribs 23 and the receiving surfaces 24 of the primary stoppers 22 are not in contact and the projecting portions of the second stopper 25 are spaced apart.

Figure 3:
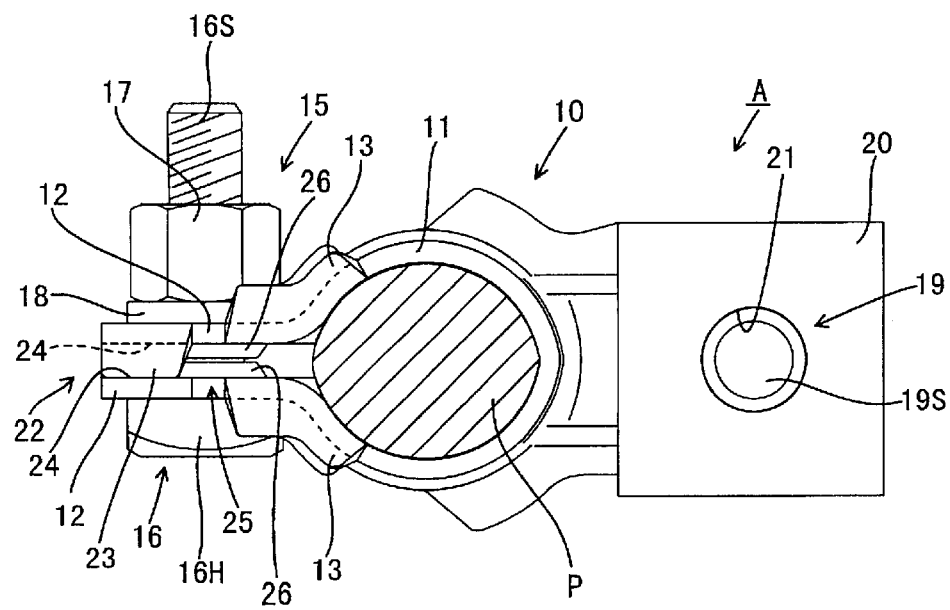
FIG. 3 is a plan view of the first embodiment with primary stoppers in their contact states.
Figure 4:
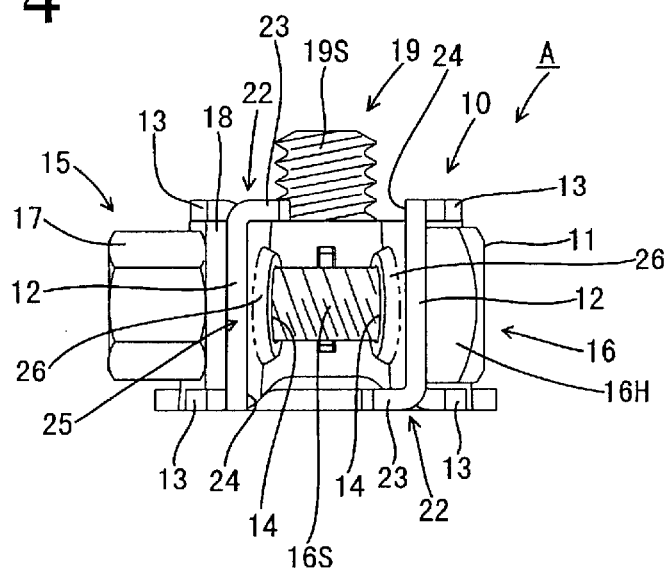
FIG. 4 is a side view of the first embodiment.
Figure 5:
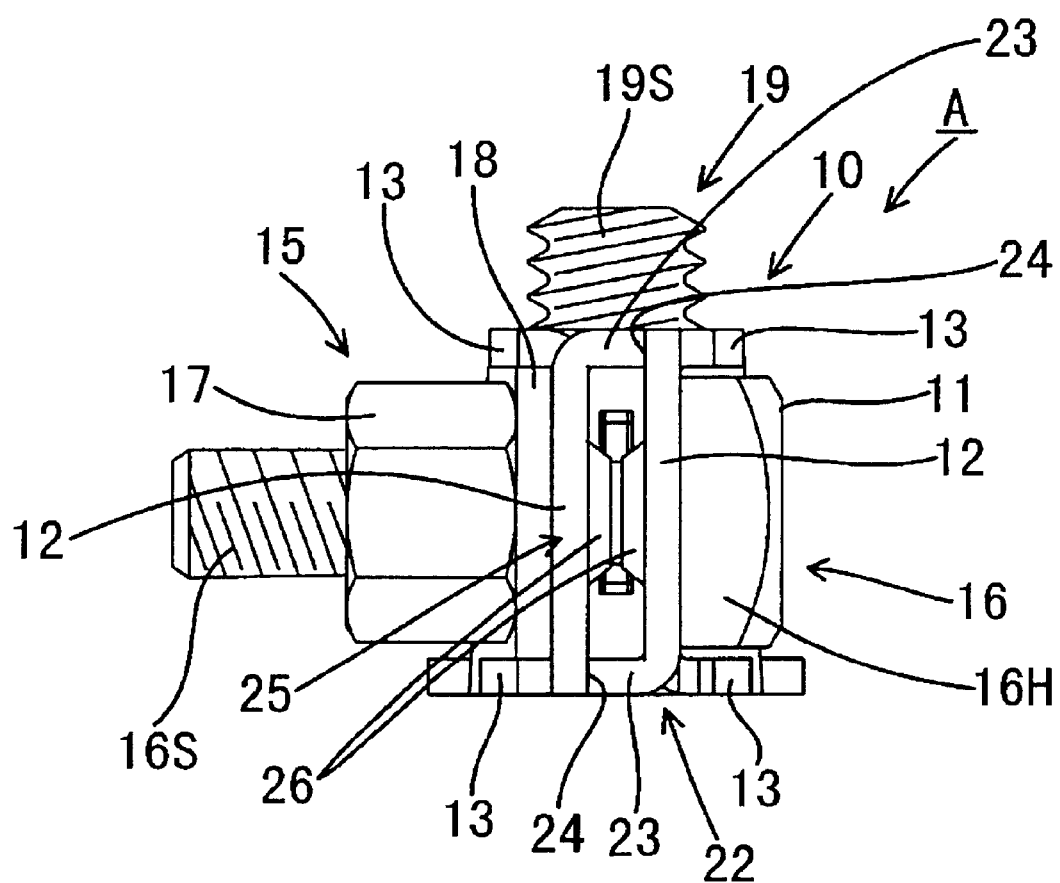
FIG. 5 is a side view of the first embodiment with the primary stoppers in their contact states.
Figure 6:
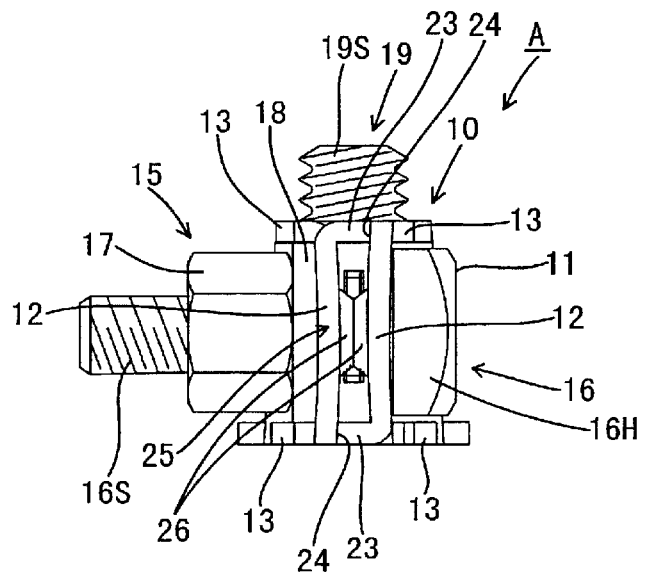
FIG. 6 is a side view of the first embodiment with a secondary stopper in its contact state.
Figure 7:
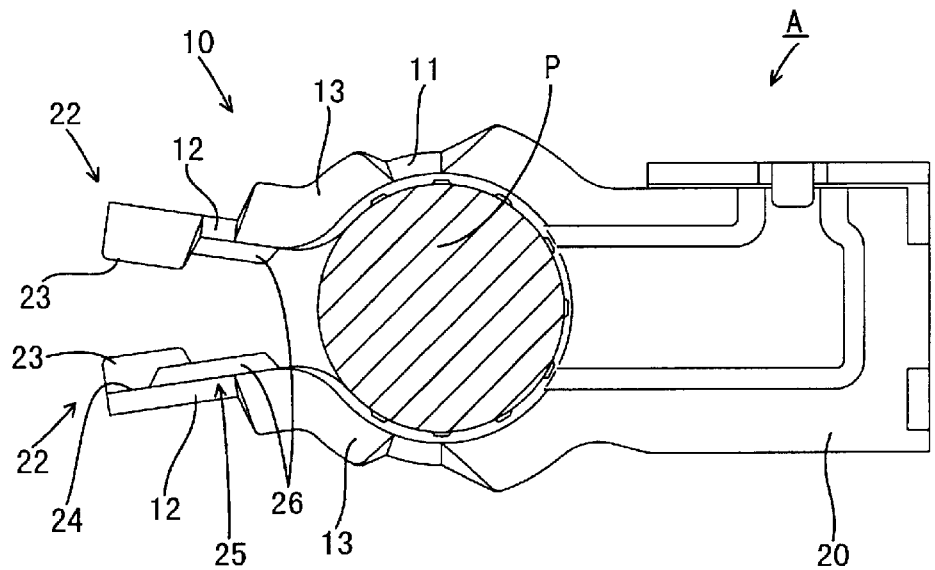
FIG. 7 is a bottom view of the first embodiment.

The fastening torque may mistakenly become larger than the specified value. In this situation, the extending portions 12 are brought closer together and have a spacing less than the proper spacing. However, the ribs 23 and the receiving surfaces 24 of the primary stoppers 22 contact each other as shown in FIGS. 3 and 5 to restrict any further movement of the extending portions 12 toward each other. This contact of the ribs 23 and the receiving surfaces 24 occurs while the spacing of the extending portions 12 still is in a permissible range, and while the fastening of the battery terminal A to the battery post P is considered to be normal. In this way, excessive fastening of the battery terminal A to the battery post P can be prevented.

The fastening torque could become larger than a value that is bearable by the primary stoppers 22. In this situation, the extending portions 12 may deform such that middle sections of the extending portions 12 near the bolt insertion holes 14 are brought closer while the ribs 23 and the receiving surfaces 24 of the primary stoppers 22 remain in contact. When the spacing between the middle portions of the extending portions 12 reaches a specified value, the ends of the projecting portions 26 of the secondary stopper 25 engage one another to restrict any further approach of the middle portions of the extending portions 12.

The inner diameter of the fastening portion 11 is not reduced in the contact state of the secondary stopper 25, because the spacing between the outer edges of the extending portions 12 is left unchanged from the spacing that exists when the primary stoppers 22 reached their contact states. Thus, the fastening force to the battery post P is not increased, and the proper fastened state is maintained during a transitional stage from the contact states of the primary stoppers 22 to the contact state of the secondary stopper 25. In other words, the secondary stopper 25 can prevent excessive fastening even if the excessive fastening preventing function of the primary stoppers 22 does not work.

Two excessive fastening preventing functions are provided respectively by the secondary stopper 25 and the primary stoppers 22 in this embodiment. Thus, reliability of the excessive fastening preventing function is higher as compared to a case where only one stopper is provided.

Elastic restoring forces are generated in the extending portions 12 that have been deformed sufficiently for the secondary stoppers 25 to be engaged. These elastic restoring forces act to separate the middle portions of the extending portions 12. Thus, the second stopper 25 restricts movement of the extending portions 12 toward each other, and the elastic restoring forces of the extending portions 12 assist such a restricting operation of the secondary stopper 25. Therefore, the approach restricting function is better as compared to a case where only the secondary stopper 25 restricts any further approach of the extending portions 12 toward each other.

The fastening torque required to deform the projecting portions 26 is set larger than the fastening torque required to fracture the bolt 16. Accordingly, an excessive fastening torque will cause the bolt 16 to fracture before the projecting portions 26 are deformed, and before the projecting portions 26 are released from the contact state. Thus, deformation of the projecting portions 26 can be prevented.

The ribs 23 of the primary stoppers 22 can be formed easily by bending, and the projecting portions 26 of the second stopper 25 can be formed easily by burring. Projecting portions 26 formed by burring are stronger than rib-shaped projecting portions that are formed by bending at right angles. Thus, projecting portions 26 formed by burring are suitably used as the secondary stopper 25, which is required to have a higher strength than the primary stoppers 22.

Figure 8:
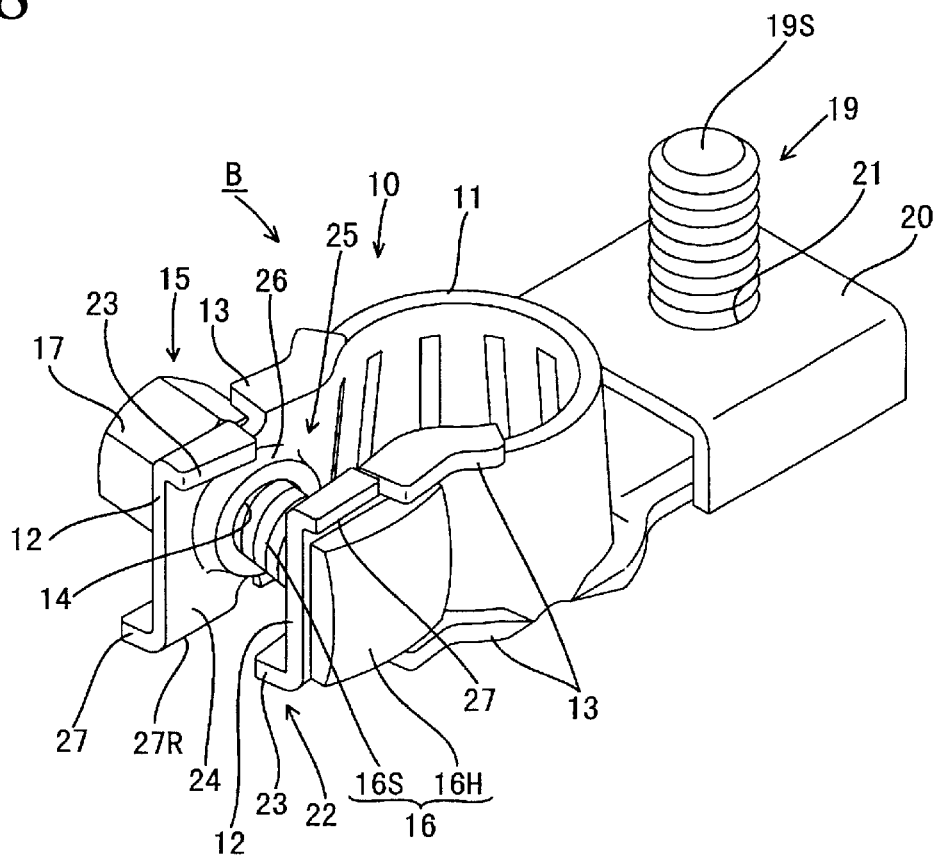
FIG. 8 is a perspective view of a second embodiment of the invention.
Figure 9:
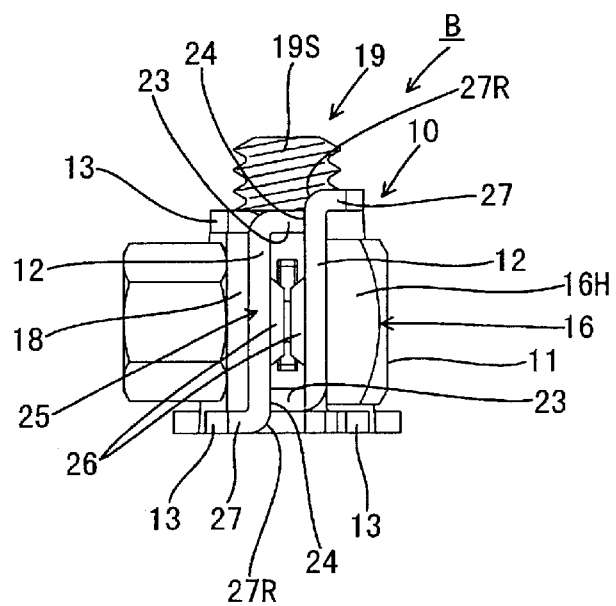
FIG. 9 is a side view of the second embodiment with primary stoppers in their contact states.

A battery terminal in accordance with a second embodiment of the invention is identified by the letter B in FIGS. 8 and 9. The battery terminal B differs from the first embodiment in the construction of the primary stoppers 22. Elements of the second embodiment that are similar to or the same as elements in the first embodiment are not described, but merely are identified by the same reference numerals.

The extending portion 12 at the right side in FIG. 9 has the receiving surface 24 of the upper primary stopper 22, and also has an outwardly bent rotation-restricting portion 27 to restrict the rotation of the head 16H of the bolt 16. An arcuate or bent surface 27R is formed on the inner surface of the bent rotation-restricting portion 27 at upper end of the extending portion 12. Accordingly, the receiving surface 24 of this extending portion 12 is set in a substantially flat area slightly below the arcuate upper end.

The extending portion 12 at the left side in FIG. 9 has the receiving surface 24 of the lower primary stopper 22 and also has an outwardly bent rotation-restricting portion 27 for restricting the rotation of the washer 18. An arcuate or bent surface 27R is formed at the bent bottom end. Thus, the receiving surface 24 that is contacted by the rib 23 is set in a substantially flat area slightly above the arcuate surface 27R.

In the second embodiment, the ribs 23 can be brought securely and stably into contact with the receiving surfaces 24 while the rotation restricting portions 27 are formed in the areas where the receiving surfaces 24 are formed.

The projecting portions 26 that define the secondary stopper 25 are formed at the edges of the bolt insertion holes 14, substantially as in the first embodiment.

Figure 10:
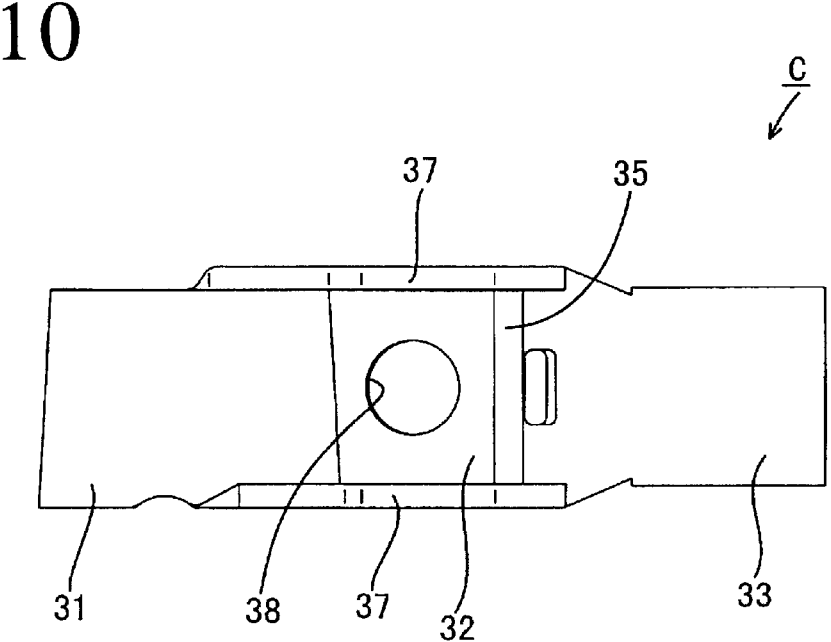
FIG. 10 is a side view of a third embodiment of the invention.
Figure 11:
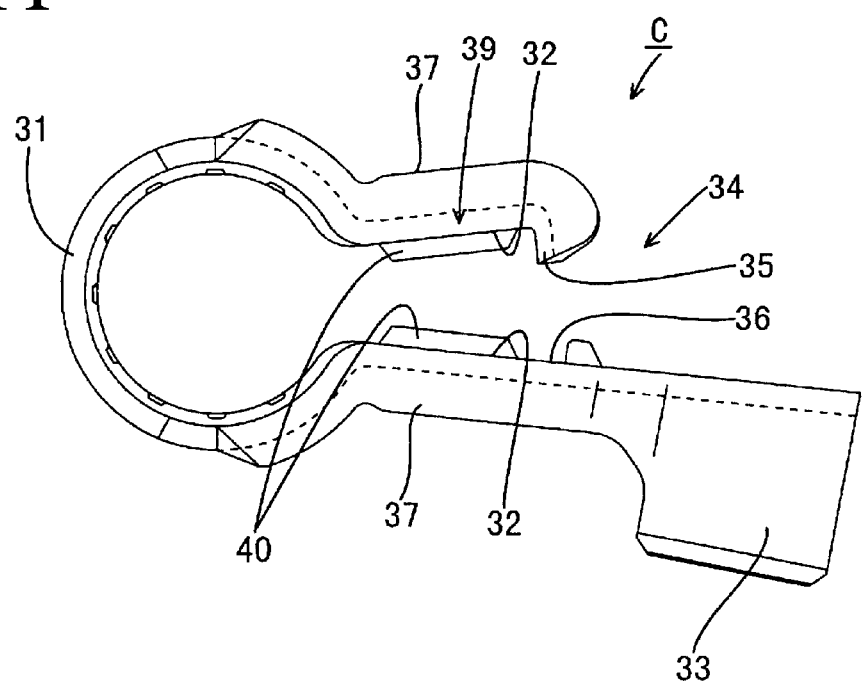
FIG. 11 is a bottom view of the third embodiment.

A battery terminal in accordance with a third embodiment of the invention is identified by the letter C in FIGS. 10 and 11. The battery terminal C includes an arcuate fastening portion 31 and first and second extending portions 32 that project substantially radially outward from opposite ends of the arcuate fastening portion 31. A barrel 33 extends from a free end of the first extending portion 32, and can be crimped to a wire (not shown). A primary stopper 34 includes a rib 35 and a receiving surface 36. The rib 35 is formed e.g. by bending a free end of the second extending portion 32 inwardly at an angle different from 0° or 180°, and preferably substantially at right angles. The inner surface of the first extending portion 12 serves as the receiving surface 36. Rib-shaped reinforcing portions 37 bulge outwardly in areas that extend from the upper ends of the fastening portion 31, to the upper ends of the extending portions 32 and further to the upper end of the rib 35. Similar reinforcing portions 37 are formed at the bottom ends. The reinforcing portions 37 displace the opposite ends of the arcuate fastening portion 31 and the extending portions 32 together, and also restrict rotation of a substantially polygonal head of an unillustrated bolt at the extending portion 32. Further, the reinforcing portions 37 restrict an inclination of the rib 35 with respect to the extending portion 32. As a result the rib 35 and the receiving surface 36 restrict any further approach of the extending portions 32 with respect to each other. Tubular projecting portions 40 define a secondary stopper 39 and are formed at the edges of bolt insertion holes 38, substantially as in the first embodiment.

The present invention is not limited to the above described and illustrated embodiments. For example, following embodiments are also embraced by the technical scope of the invention as defined in the claims. Besides these embodiments, various changes can be made without departing from the scope and spirit of the invention as defined in the claims.

The primary stoppers are formed by bending the ends of the extending portions and the secondary stopper is formed by applying burring to the edges of the bolt insertion holes according to the foregoing embodiments. However, the primary and second stoppers may be formed in other positions by other methods according to the present invention.

The tubular projecting portions of the second stopper are formed in both extending portions in the foregoing embodiments. However, one projecting portion may be formed in either one of the extending portions according to the present invention.

In the foregoing embodiment, the extending portions are deformed and their elastically restoring forces function as a reaction force against the fastening torque when the secondary stopper is in the contact state. However, according to the invention, the secondary stopper may be brought into the contact state without the extending portions being deformed (without action of the elastically restoring forces of the extending portions) when the primary stoppers are deformed to cancel their contact states.

What is claimed is:

1. A battery terminal (A-C), comprising:
   an arcuate fastening portion (11; 31) to be fitted on a battery post (P),
   first and second extending portions (12; 32) extending from the arcuate fastening portion (11; 31), and
   a fastening means (15) for deforming the fastening portion (11; 31) to reduce its diameter by bringing the extending portions (12; 32) closer to each other,
   wherein at least one of the extending portions (12; 32) comprises:
   a primary stopper (22; 34) for restricting movement of the extending portions (12; 32) toward each other by being brought into a contact state when a space between the extending portions (12; 32) is narrowed to a specified degree, and
   a secondary stopper (25; 39) for restricting movement of the extending portions (12; 32) toward each other by being brought into a contact state when the space between the extending portions (12; 32) is less than the state where the primary stopper (22; 34) is substantially in the contact state while being accompanied by deformation of at least one of the primary stopper (22; 34) and the extending portions (12; 32).

2. A battery terminal according to claim 1, wherein the extending portions (12; 32) extend radially outward from opposite ends of the arcuate fastening portion (11; 31).

3. A battery terminal according to claim 2, wherein an elastic restoring force of the primary stopper (22; 34) and the extending portions (12; 32) after deformation acts to separate the extending portions (12; 32) away from each other while the secondary stopper (25; 39) restricts any movement of the extending portions (12; 32) toward each other.

4. A battery terminal according to claim 1, wherein the fastening means (15) comprises a bolt (16) and a nut (17).

5. A battery terminal according to claim 4, wherein a fastening torque required to deform the secondary stopper (25; 39) is greater than a fastening torque required to fracture the bolt (16).

6. A battery terminal according to claim 1, wherein the primary stopper (22; 34) comprises at least one rib (23; 35) formed on the first extending portion (12; 32), and a receiving surface (24; 36) formed at a location on the second extending portion (12; 32) to enable a contact by the rib (23; 35).

7. A battery terminal according to claim 6, wherein the rib (23; 35) is formed by bending an outer end of one the extending portion (12; 32) at substantially right angles.

8. A battery terminal according to claim 1, wherein the secondary stopper (25; 39) comprises substantially tubular projections (26; 40) formed on the extending portions (12; 32) to project substantially toward each other.

9. A battery terminal according to claim 8, wherein the substantially tubular projecting portions (26; 40) are formed by burring edges of bolt insertion holes (14) of the respective extending portions (12; 32).

10. A battery terminal according to claim 1, wherein the extending portions (12; 32) each are formed with portions the primary stopper (22; 34) and the secondary stopper (25; 39).

* * * * *